United States Patent
Munsen et al.

(10) Patent No.: US 9,180,958 B2
(45) Date of Patent: Nov. 10, 2015

(54) AIRCRAFT, AIRFRAMES AND ASSOCIATED METHODS

(75) Inventors: Victor A. Munsen, Woodinville, WA (US); David Neal Berry, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 299 days.

(21) Appl. No.: 13/480,918

(22) Filed: May 25, 2012

(65) Prior Publication Data
US 2013/0313368 A1 Nov. 28, 2013

(51) Int. Cl.
*B64C 1/12* (2006.01)
*B64C 1/00* (2006.01)

(52) U.S. Cl.
CPC ............ *B64C 1/12* (2013.01); *B64C 2001/0072* (2013.01); *B64C 2001/0081* (2013.01); *Y02T 50/433* (2013.01); *Y10T 29/49622* (2015.01)

(58) Field of Classification Search
CPC .................................... B64C 1/00; B64C 3/26
USPC ........ 244/132, 119, 120, 123.1, 123.2, 123.8, 244/131; 52/508, 576, 577, 783.1, 795.1
See application file for complete search history.

(56) References Cited

U.S. PATENT DOCUMENTS

| 2,261,558 | A | * | 11/1941 | Orloff ........................... 244/130 |
|---|---|---|---|---|
| 4,080,768 | A | * | 3/1978 | Trixl ............................... 52/521 |
| 4,858,853 | A | * | 8/1989 | Westerman et al. ........... 244/119 |
| 4,861,643 | A | * | 8/1989 | Scollard ......................... 428/162 |
| 4,966,802 | A | * | 10/1990 | Hertzberg ...................... 428/119 |
| 5,171,623 | A | * | 12/1992 | Yee ................................ 428/156 |
| 5,378,524 | A | * | 1/1995 | Blood ............................ 428/141 |
| 5,518,208 | A | * | 5/1996 | Roseburg ....................... 244/132 |
| 6,638,466 | B1 | | 10/2003 | Abbott |
| 6,811,122 | B2 | * | 11/2004 | Aramburu et al. ............. 244/131 |
| 7,097,731 | B2 | | 8/2006 | Puriefoy et al. |
| 7,635,106 | B2 | * | 12/2009 | Pham et al. .................... 244/131 |
| 8,104,158 | B2 | * | 1/2012 | Floyd et al. ................. 29/402.11 |
| 8,114,501 | B2 | * | 2/2012 | Brandon et al. ............... 428/174 |
| 8,128,025 | B2 | * | 3/2012 | Rawdon et al. ........... 244/117 R |
| 8,528,862 | B2 | * | 9/2013 | Liguore et al. ................ 244/119 |
| 2008/0111024 | A1 | * | 5/2008 | Lee et al. ....................... 244/121 |
| 2008/0290214 | A1 | * | 11/2008 | Guzman et al. ............... 244/119 |
| 2009/0039208 | A1 | * | 2/2009 | Raeckers .................... 244/35 R |
| 2010/0301166 | A1 | * | 12/2010 | Bichsel ......................... 244/131 |
| 2010/0320325 | A1 | * | 12/2010 | Parikh et al. .................. 244/130 |
| 2011/0164918 | A1 | | 7/2011 | Cosentino |

OTHER PUBLICATIONS

Dr. L. J. Hart-Smith, "Lessons Learned by One Aerospace Structures Engineer in a 40-Year Career," 6th Australasian Congress on Applied Mechanics, ACAM 6 Dec. 12-15, 2010, Perth, Australia.
Imperiale et al., "A Novel Design Solution for Improving Far-field Strain Allowables of Composite Stringer Terminations," University of Bristol, England, United Kingdom.

* cited by examiner

*Primary Examiner* — Brian M O'Hara
*Assistant Examiner* — Jessica Wong
(74) *Attorney, Agent, or Firm* — DASCENZO Intellectual Property Law, P.C.

(57) ABSTRACT

Aircraft and airframes include a skin operatively coupled to a structural reinforcement member. The structural reinforcement member and the skin collectively define a run-out region that encompasses a terminal edge of the structural reinforcement member. Within the run-out region, the skin is more flexible than in adjacent portions of the skin. Methods include defining a region of increased flexibility of a skin relative to adjacent portions of the skin, and operatively coupling the skin to a structural reinforcement member.

11 Claims, 3 Drawing Sheets

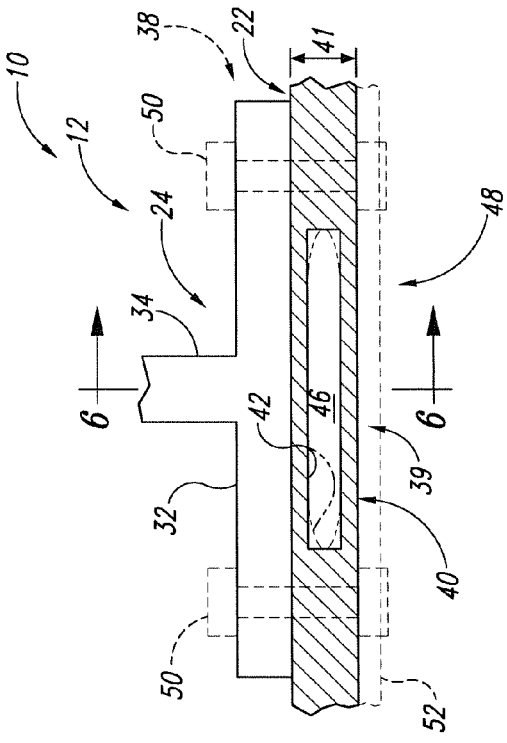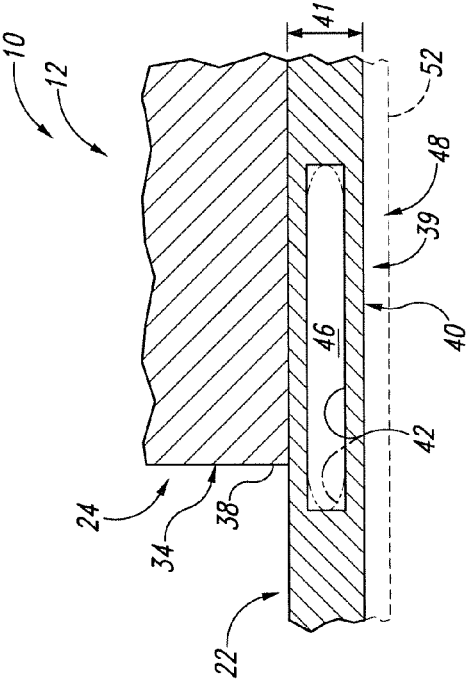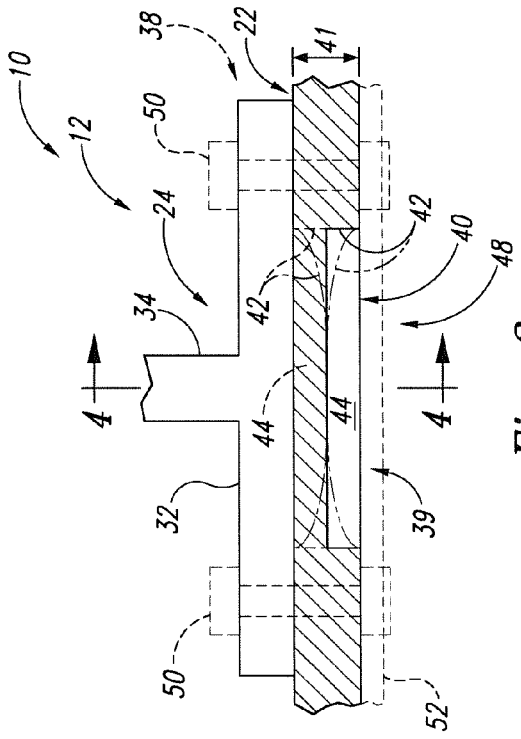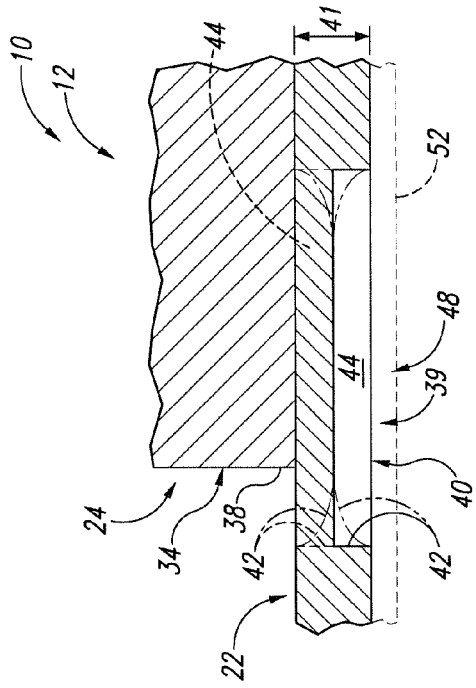

AIRCRAFT, AIRFRAMES AND ASSOCIATED METHODS

FIELD

The present disclosure relates to aircraft airframes.

BACKGROUND

Aircraft airframes typically utilize a semi-monocoque (or stiffened shell) construction. In this type of construction, a skin is coupled to a series of stiffening members that define the overall shape of the airframe. In various positions on an airframe, a stiffening member may terminate, at which point the joint between the skin and the stiffening member is susceptible to failure due to the increased bending stresses within the region of the stiffening member's termination, such as due to flexing of the shell structure within that region.

SUMMARY

Aircraft and airframes according to the present disclosure include a structural reinforcement member and a skin that is operatively coupled to the structural reinforcement member. The structural reinforcement member has a terminal end region, and the skin and the structural reinforcement member collectively define a run-out region that encompasses the terminal end region of the structural reinforcement member and a portion of the skin adjacent to the terminal end region of the structural reinforcement member. Within the run-out region, the skin is more flexible than in adjacent portions of the skin.

Methods of constructing an airframe according to the present disclosure include defining a region of increased flexibility of an airframe's skin relative to adjacent portions of the skin, and operatively coupling the skin to a structural reinforcement member so that the region of increased flexibility is within a run-out region. The run-out region encompasses a terminal end region of the structural reinforcement member and a portion of the skin that is adjacent to the terminal end region of the structural reinforcement member.

BRIEF DESCRIPTION OF THE DRAWINGS

FIG. 3 is a schematic fragmentary cross-sectional view representing illustrative, non-exclusive examples of airframes according to the present disclosure and corresponding to the line 3-3 in FIG. 2.

FIG. 4 is a schematic fragmentary cross-sectional view representing the illustrative, non-exclusive examples of airframes schematically illustrated in FIG. 3 and corresponding to the lines 4-4 in FIGS. 2 and 3.

FIG. 5 is a schematic fragmentary cross-sectional view representing additional illustrative, non-exclusive examples of airframes according to the present disclosure and corresponding to the line 3-3 in FIG. 2.

FIG. 6 is a schematic fragmentary cross-sectional view representing the illustrative, non-exclusive examples of airframes schematically illustrated in FIG. 5 and corresponding to the line 4-4 in FIG. 2 and the line 6-6 in FIG. 5.

DESCRIPTION

Figure 1:
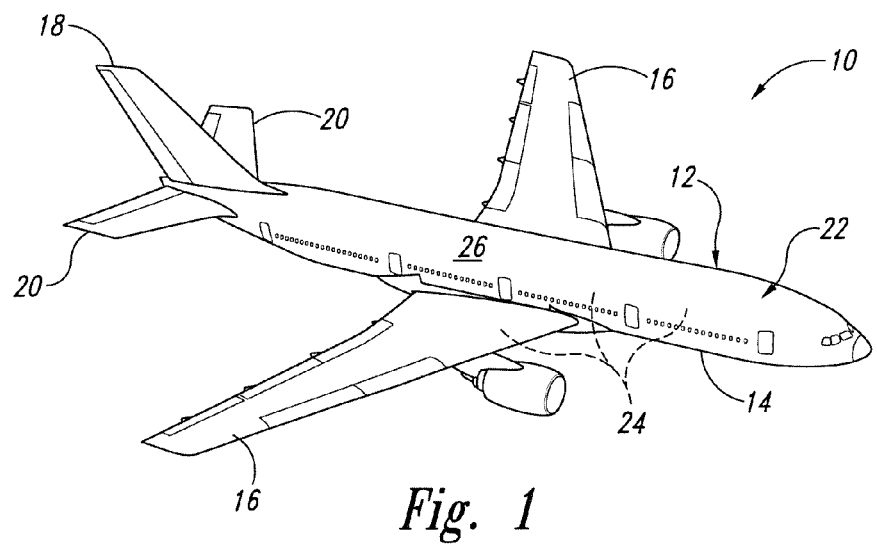
FIG. 1 is an isometric view of an aircraft.

Aircraft, airframes of aircraft, and methods of constructing airframes and aircraft are disclosed herein. In FIG. 1, an example of an aircraft 10 is generically and generally schematically illustrated. Aircraft 10 according to the present disclosure may take any suitable form, including commercial aircraft, military aircraft, or any other suitable aircraft. While FIG. 1 illustrates an aircraft 10 in the form of a fixed wing aircraft, other types and configurations of aircraft are within the scope of the present disclosure. Aircraft 10 include airframes 12, which may define, or at least partially define, such illustrative, non-exclusive components as a fuselage 14, wings 16, vertical stabilizer 18, horizontal stabilizers 20, etc.

Airframes 12 include a skin 22 that is operatively coupled to a series of structural reinforcement members 24. The skin 22 of an aircraft 10 at least partially defines the outer surface 26 of the aircraft 10. Skins 22 may be constructed of any suitable material including metals and composite materials. For example, aluminum alloys and carbon fiber reinforced composite materials may be used to construct skins 22. As used herein, a carbon fiber reinforced composite material should be understood to include at least an epoxy or other polymer or binding material together with carbon fibers. Other fibers (e.g., boron and Kevlar) other than carbon fibers also are within the scope of carbon fiber reinforced composite materials, as used herein. Carbon fiber reinforced composite materials additionally or alternatively may be described as or referred to as carbon fiber reinforced polymers.

Figure 2:
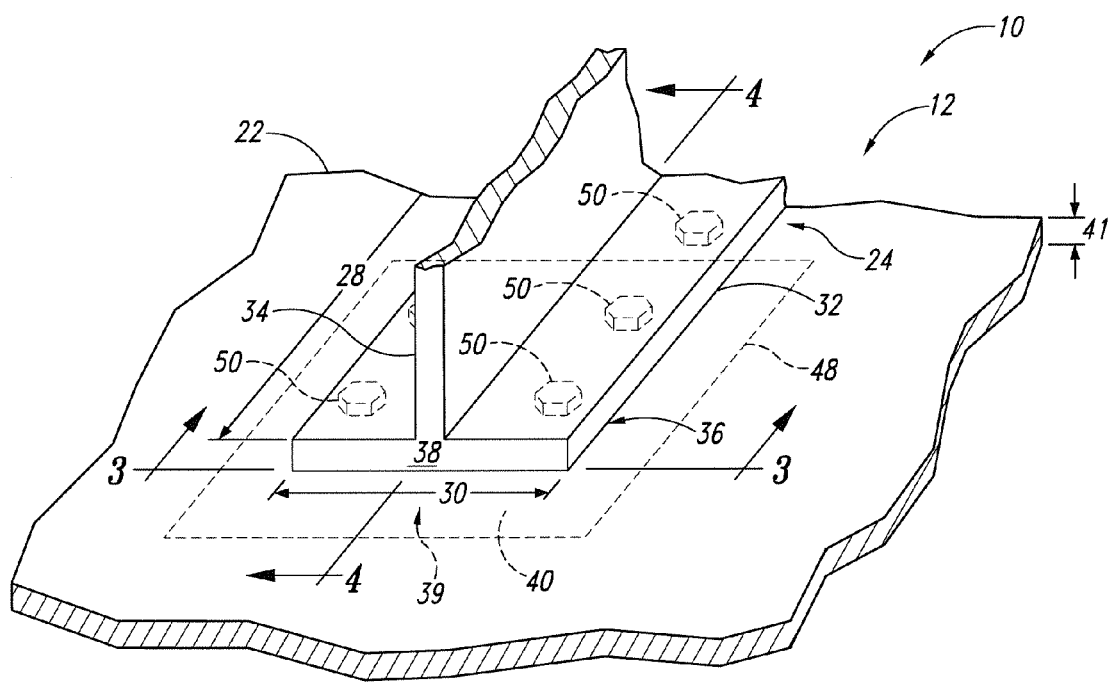
FIG. 2 is a schematic fragmentary isometric view depicting a portion of an airframe according to the present disclosure.

Structural reinforcement members 24 give stability to the skins 22 of an airframe 12 and provide a frame, on which the skin 22 is operatively coupled, such as illustrated somewhat schematically in FIG. 2. Structural reinforcement members 24 may take any suitable form, and the fragmented example schematically represented in FIG. 2 does not limit the scope of structural reinforcement members 24 according to the present disclosure. For example, structural reinforcement members 24 generally may have an I-shaped, H-shaped, T-shaped, L-shaped, or hat-shaped cross-sectional profile or any other suitable shape or shapes of cross-sectional profiles, depending on the particular region of the airframe 12 including a structural reinforcement member 24, depending on the specific application of the structural reinforcement member 24, etc. Structural reinforcement members are not required to have a uniform cross-sectional profile. Structural reinforcement members 24 additionally or alternatively may be described as or referred to as stiffeners 24, panel stiffeners 24, skin stiffeners 24, stringers 24, and/or frame members 24.

Structural reinforcement members 24 may be described in terms of a longitudinal direction and a lateral direction, with the longitudinal direction referring to the longer dimension 28 of a structural reinforcement member 24, and with the lateral direction referring to the shorter dimension 30 of a structural reinforcement member. The longer dimension 28 additionally or alternatively may be described as or referred to as the longitudinal dimension 28 or as the length 28 of the structural reinforcement member 24, and the shorter dimension 30 additionally or alternatively may be described as or referred to as the lateral dimension 30 or as the width 30 of the structural reinforcement member 24.

Moreover, other aspects and components of airframes 12 may be described in terms of relative relationships between such other aspects or components and a structural reinforcement member 24. Accordingly, an aspect or component that is described as extending longitudinally relative to a structural reinforcement member 24 is interpreted to extend in a direction that is parallel to the longitudinal dimension 28 of the structural reinforcement member 24, and an aspect or component that is described as extending laterally relative to a structural reinforcement member 24 is interpreted to extend in a direction that is parallel to the lateral dimension 30 of the structural reinforcement member 24. Similarly, an aspect or component of an airframe 12 that is described as being longitudinally spaced away from another aspect or component of an airframe 12 is interpreted to be spaced away from such other aspect or component in a direction that is parallel to the longitudinal dimension 28 of the structural reinforcement member 24, and an aspect or component of an airframe 12 that is described as being laterally spaced away from another aspect or component of an airframe 12 is interpreted to be spaced away from such other aspect or component in a direction that is parallel to the lateral dimension 30 of the structural reinforcement member 24.

As schematically illustrated in FIG. 2, structural reinforcement members 24 may include a base flange 32 and a leg 34 that extends from the base flange 32. In the illustrated example, the base flange 32 extends laterally on both sides of the leg 34; however, such a configuration is not required, and as discussed herein, other configurations of structural reinforcement members 24 are within the scope of the present disclosure.

Structural reinforcement members 24 may be described as including a terminal end region 36 that includes a terminal edge 38 of the structural reinforcement member 24. As illustrated in FIG. 2, the skin 22 is operatively coupled to the base flange 32 opposite the leg 34, and the skin 22 extends longitudinally beyond the terminal edge 38. That is, the skin 22 does not include a corresponding edge that coincides with the terminal edge 38 of the structural reinforcement member 24 that is illustrated in FIG. 2. Airframes 12 according to the present disclosure include at least one such structural reinforcement member 24, whose terminal edge 38 does not coincide with a corresponding edge of the skin 22, or at least a portion thereof.

As schematically indicated in FIG. 2, the skin 22 and the structural reinforcement member 24 collectively define a run-out region 48 of the airframe 12, which encompasses the terminal end region 36 of the structural reinforcement member 24 and a portion of the skin 22 that is adjacent to the terminal end region 36. Within the run-out region 48, the skin 22 defines a region 39 that is more flexible than adjacent regions of the skin 22. A region 39 additionally or alternatively may be referred to or described as a region of increased flexibility 39 or region of increased transverse flexibility 39 relative to adjacent portions of the skin 22, or as a region of decreased stiffness 39 or region of decreased transverse stiffness 39 that is less stiff than adjacent regions of the skin 22. The flexibility and/or stiffness of the region 39 may be described in terms of a flexibility and/or stiffness in the direction of, or through, the thickness 41 of the skin 22.

The region 39 may help to restrict or even prevent separation of the skin 22 from the structural reinforcement member 24 in the run-out region 48, when the run-out region 48 of the airframe 12 is under a bending stress, such as a tensile bending stress or a compressive bending stress. For example, in examples of airframes 12 in which the skin 22 is adhered to the structural reinforcement member 24 within the run-out region 48, as discussed optionally herein, the region of increased flexibility 39 may reduce the likelihood of or even prevent the separation of the adhesive between the skin 22 and the structural reinforcement member 24 within the run-out region 48. Moreover, the region 39 may reduce the likelihood of or even prevent a separation of the adhesive between the skin 22 and the structural reinforcement member 24 within the run-out region 48 from propagating along the length 28 of the structural reinforcement member 24.

The run-out region 48 of an airframe 12 may be described in terms of a size and/or position relative to the structural reinforcement member 24. For example, in some embodiments, the run-out region 48 may extend longitudinally relative to and extensive with the structural reinforcement member 24 from the terminal edge 38 for a longitudinal distance along the structural reinforcement member 24. As illustrative, non-exclusive examples, a run-out region 48 may run from the terminal edge 38 along the structural reinforcement member 24 for a distance that is less than five times the lateral width 30, for a distance that is less than four times the lateral width 30, for a distance that is less than three times the lateral width 30, for a distance that is less than two times the lateral width 30, or for a distance that is less than the lateral width 30.

In some embodiments, the run-out region 48 also may extend longitudinally relative to and away from the structural reinforcement member 24. As illustrative, non-exclusive examples, a run-out region 48 may extend longitudinally away from the structural reinforcement member 24 for a distance measured from the terminal edge 38 that is less than five times the lateral width 30, for a distance measured from the terminal edge 38 that is less than four times the lateral width 30, for a distance measured from the terminal edge 38 that is less than three times the lateral width 30, for a distance measured from the terminal edge 38 that is less than two times the lateral width 30, or for a distance measured from the terminal edge 38 that is less than the lateral width 30. Accordingly, in some embodiments, the run-out region 48 may not extend the full longitudinal length 28 of the structural reinforcement member 24.

In some embodiments, the run-out region 48 additionally or alternatively may extend laterally relative to the structural reinforcement member 24. As an illustrative, non-exclusive example, the run-out region 48 may extend laterally relative to the structural reinforcement member 24 for a distance that is less than the width 30.

In some embodiments, although not required to all embodiments of airframes 12 according to the present disclosure, the region of increased flexibility 39 may include and/or define a region of reduced cross-sectional area 40. The region of reduced cross-sectional area 40 of the skin 22 additionally or alternatively may be referred to or described as a region of reduced volume 40 of the material from which the skin 22 is constructed. By "reduced," it is meant that the region of reduced cross-sectional area 40 includes less volume of material from which the skin 22 is constructed relative to a similarly sized region of the skin 22 that is not a region of reduced cross-sectional area 40. The region of reduced cross-sectional area 40 may facilitate the increased flexibility and/or the decreased stiffness associated with the region of increased flexibility 39.

The airframes 12 schematically represented in FIGS. 3-7 include illustrative, non-exclusive examples of regions of reduced cross-sectional area 40. With reference to FIGS. 3-6, regions of reduced cross-sectional area 40 may be described as defining a void 42, and/or the skins 22 may be described as defining a void 42 within a region of reduced cross-sectional area 40. FIGS. 3-4 illustrate examples of voids 42 that may be described as open voids 44, because the open voids 44 are not bound on all sides by the material from which the skin 22 is constructed. FIGS. 5-6, on the other hand, illustrate voids 42 that may be described as closed voids 46, because the closed voids 46 are bound on all sides by the material from which the skin 22 is constructed. An open void 44 additionally or alternatively may be described as a recess 44, and a closed void 46 additionally or alternatively may be described as a pocket 46.

As illustrated schematically in solid lines in FIGS. 3-4, an open void 44 may face away from the structural reinforcement member 24. However, in some embodiments, as schematically and optionally illustrated in dash-dot lines in FIG. 3, an open void 44 may face toward the structural reinforcement member 24.

While the examples of FIGS. 3-6 schematically illustrate in solid lines the regions of reduced cross-sectional area 40 with generally rectangular boxes, this representation is schematic in nature and is interpreted to indicate that regions of reduced cross-sectional area 40 may have any suitable cross-sectional profiles. For example, as illustrated in various broken lines in FIGS. 3-6, regions of reduced cross-sectional areas 40 and voids 42 may have cross-sectional profiles that have curved portions and/or that do not have sharp edges or corners. Stated differently, in some embodiments, voids 42 may be free of sharp edges or corners.

Figure 7:
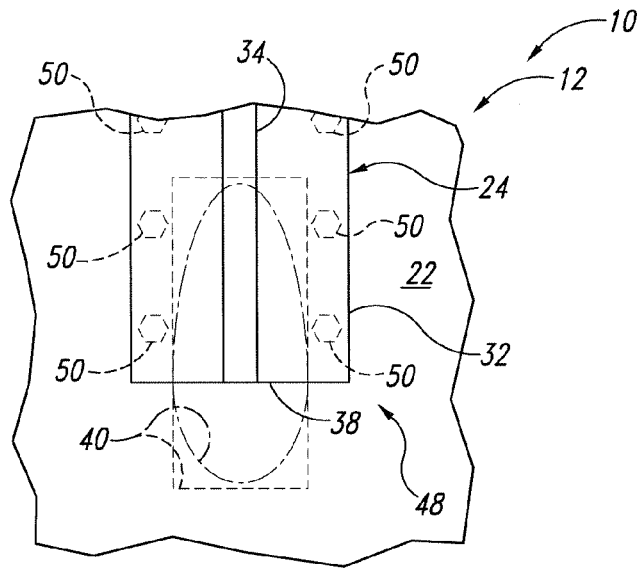
FIG. 7 is a schematic fragmentary plan view representing illustrative, non-exclusive examples of airframes according to the present disclosure and schematically illustrating non-exclusive examples of regions of reduced cross-sectional area.

FIG. 7 schematically illustrates a plan view of an airframe 12, schematically illustrating non-exclusive examples of regions of reduced cross-sectional area 40. As schematically illustrated, in some embodiments the region of reduced cross-sectional area 40 may be longitudinally aligned with the structural reinforcement member 24, including the leg 34 thereof. Moreover, in some embodiments, the region of reduced cross-sectional area 40 may extend adjacent to the terminal end region 38 of the structural reinforcement member 24. Moreover, in some embodiments, the region of reduced cross-sectional area 40 may extend longitudinally beyond the terminal end region 38.

As mentioned, the skin 22 may be adhered to or co-bonded with the base flange 32 of the structural reinforcement member 24. Illustrative, non-exclusive examples of suitable adhesives and resins that may be used include (but are not limited to) epoxies, unsaturated polyesters, polyetherkeytone, and other materials. In some embodiments, the base flange 32 is adhered to the skin 22 within an entirety of the interface between the base flange 32 and the skin 22 within the run-out region 48. In some embodiments, the base flange 32 is adhered to the skin 22 within the run-out region 48. In some embodiments, the base flange 32 is adhered to the skin 22 within an entirety of the interface between the base flange 32 and the skin 22. In some embodiments, the base flange 32 is not adhered to the skin 22 within at least a portion of the interface between the base flange 32 and the skin 22 within the run-out region 48. In some such embodiments, the portion of the interface between the base flange 32 and the skin 22 within the run-out region 48 in which adhesive is not used is aligned with and optionally is coextensive with the optional region of reduced cross-sectional area 40.

As schematically and optionally illustrated in dashed lines in FIGS. 2-7, an airframe 12 additionally or alternatively may include one or more fasteners 50 that extend through and that operatively couple, or at least assist in operatively coupling, the structural reinforcement member 24 and the skin 22. The optional fasteners 50 may be in addition to or as an alternative to the optional adhesive discussed herein.

The various number and positions of the schematically illustrated fasteners 50 in FIGS. 2-7 are not limiting, and any suitable number of fasteners 50 may be used, including zero fasteners 50. In some embodiments, an airframe 12 may include one or more fasteners 50 that extend within the run-out region 48. Additionally or alternatively, in some embodiments, an airframe 12 may include at least one fastener 50 that is outside of and adjacent to the run-out region 48. Additionally or alternatively, in embodiments that include a region of reduced cross-sectional area 40, an airframe 12 may include at least one fastener 50 that is positioned laterally adjacent to the region of reduced cross-sectional area 40 within the run-out region 48. Additionally or alternatively, in embodiments that include a void 42, an airframe 12 may include at least one fastener 50 that is positioned laterally adjacent to the void 42. Additionally or alternatively, in embodiments that include a region of reduced cross-sectional area 40, an airframe 12 may include one or more fasteners 50 that do not extend through the region of reduced cross-sectional area 40. Additionally or alternatively, in embodiments that include a void 42, an airframe 12 may include one or more fasteners 50 that do not extend through the void 42. In some embodiments, an airframe 12 may be free of fasteners 50 that extend through the structural reinforcement member 24 and the skin 22 within the run-out region 48.

As schematically illustrated in dashed lines in FIGS. 3-6, airframes 12 optionally may include a splice plate 52 coupled to the skin 22 opposite the structural reinforcement member 24, including within the run-out region 48. Splice plates 52, when present, may be used to interconnect adjacent portions of an airframe 12.

Figure 8:
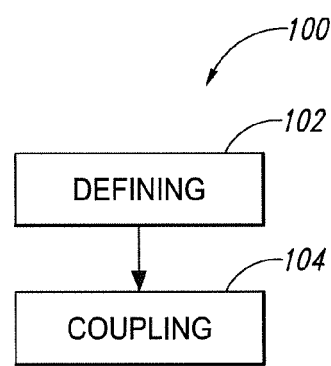
FIG. 8 is a flowchart schematically representing illustrative, non-exclusive examples of methods according to the present disclosure.

Turning now to FIG. 8, methods of constructing an airframe 12 according to the present disclosure are schematically represented and indicated at 100. Methods 100 include defining a region of increased flexibility 39 of a skin 22, as indicated at 102, and operatively coupling the skin 22 to a structural reinforcement member 24, as indicated at 104. The operative coupling 104 includes positioning the region of increased flexibility 39 within the run-out region 48.

Figure 9:
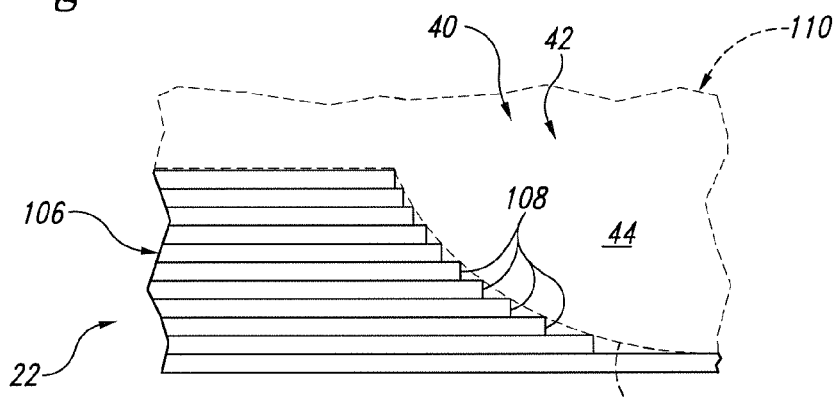
FIG. 9 is a schematic fragmentary profile view representing illustrative, non-exclusive examples of skins together with illustrative, non-exclusive examples of molds that may be used to construct the skins.
Figure 10:
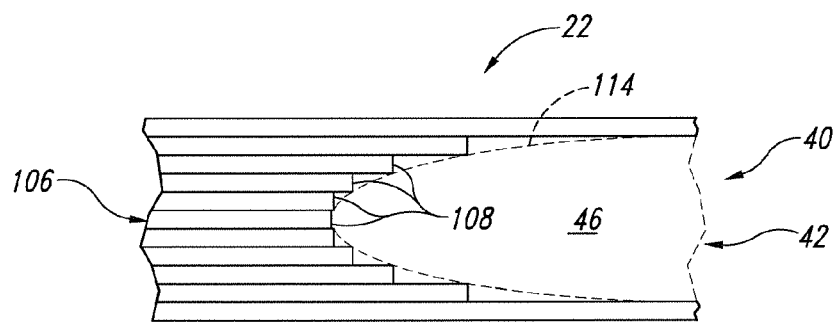
FIG. 10 is a schematic fragmentary profile view representing additional illustrative, non-exclusive examples of skins together with illustrative, non-exclusive examples of molds that may be used to construct the skins.

When constructing an airframe 12 with a skin 22 that includes an optional region of reduced cross-sectional area 40, the defining 102 includes defining the region of reduced cross-sectional area 40 of the skin 22. When constructing an airframe 12 with a skin 22 that includes an optional region of reduced cross-sectional area 40 and that is constructed of a carbon fiber reinforced composite material, the defining 102 includes layering a plurality of layers 106 of carbon fiber reinforced composite material so that edges 108 of a subset of the layers 106 at least partially define a void 42 that defines the region of reduced cross-sectional area 40 of the skin 22. Examples of such skins 22 are schematically represented in FIGS. 9-10, with FIG. 9 representing an example that defines an open void 44 and with FIG. 10 representing an example that defines a closed void 46.

In some such methods, in which the skin 22 is constructed of carbon fiber reinforced composite material, the defining 102 may include molding carbon fiber reinforced composite material to form the skin. For example, with reference to FIG. 9, in some such methods, the molding may include utilizing a mold 110 that includes a protrusion 112 that defines an open void 44 in the skin 22. Additionally or alternatively, with reference to FIG. 10, in some such methods, the molding may include molding carbon fiber reinforced composite material around an insert 114, and optionally a hollow insert 114, so that the insert 114 defines a closed void 46 within the skin 22.

In some methods 100, the coupling 104 may include adhering the skin 22 to the structural reinforcement member 24. In some such methods, the adhering may include adhering the skin 22 to the structural reinforcement member 24 within the run-out region 48. Additionally or alternatively, in some such methods, the adhering may include adhering the skin 22 to the structural reinforcement member 24 only within a portion of the interface between the structural reinforcement member 24 and the skin 22 within the run-out region 48. Additionally or alternatively, in some such methods, the adhering may include adhering the skin 22 to the structural reinforcement member 24 within an entirety of the interface between the structural reinforcement member 24 and the skin 22. In other of such methods, the adhering may not include adhering the skin 22 to the structural reinforcement member 24 within the run-out region 48.

In some methods 100, the coupling 104 additionally or alternatively may include fastening the structural reinforcement member 24 to the skin 22 with one or more fasteners 50 that extend through the structural reinforcement member 24 and the skin 22 outside of and adjacent to the run-out region 48.

In some methods, the coupling 104 additionally or alternatively may include fastening the structural reinforcement member 24 to the skin 22 with one or more fasteners 50 that extend through the structural reinforcement member 24 and the skin 22 within the run-out region 48. In some such methods and when a skin 22 having a region of reduced cross-sectional area 40 is utilized, the one or more fasteners 50 may extend through the structural reinforcement member 24 and the skin 22 laterally adjacent to the region of reduced cross-sectional area 40.

Illustrative, non-exclusive and non-exhaustive examples of inventive subject matter according to the present disclosure are described in the following enumerated paragraphs:

A. An airframe, comprising:

a structural reinforcement member including a base flange and a leg extending from the base flange, wherein the structural reinforcement member has a terminal end region that includes a terminal edge of the structural reinforcement member; and a skin operatively coupled to the base flange opposite the leg and extending longitudinally beyond the terminal end region of the structural reinforcement member, wherein the skin and the structural reinforcement member collectively define a run-out region encompassing the terminal end region of the structural reinforcement member and a portion of the skin adjacent to the terminal end region of the structural reinforcement member, and further wherein within the run-out region the skin is more flexible than within portions of the skin that are adjacent to the run-out region.

A1. The airframe of paragraph A, wherein the base flange has a lateral width, and wherein the run-out region extends longitudinally relative to and extensive with the structural reinforcement member from the terminal edge of the structural reinforcement member for less than five times the lateral width, less than four times the lateral width, less than three times the lateral width, less than two times the lateral width, or less than the lateral width.

A1.1 The airframe of paragraph A1, wherein the run-out region further extends longitudinally relative to and away from the structural reinforcement member from the terminal edge of the structural reinforcement member for less than five times the lateral width, less than four times the lateral width, less than three times the lateral width, less than two times the lateral width, or less than the lateral width.

A2. The airframe of any of paragraphs A-A1.1, wherein the base flange has a lateral width, and wherein the run-out region extends laterally relative to the structural reinforcement member for at least the lateral width.

A3. The airframe of any of paragraphs A-A2, wherein the run-out region does not extend a full longitudinal length of the structural reinforcement member.

A4. The airframe of any of paragraphs A-A3, wherein within the run-out region the skin includes a region of reduced cross-sectional area relative to portions of the skin that are adjacent to the region of reduced cross-sectional area.

A4.1 The airframe of paragraph A4, wherein the region of reduced cross-sectional area is coextensive with the run-out region.

A4.2 The airframe of any of paragraphs A4-A4.1, wherein the region of reduced cross-sectional area is longitudinally aligned with the leg of the structural reinforcement member.

A4.3 The airframe of any of paragraphs A4-A4.2, wherein the region of reduced cross-sectional area extends adjacent to the terminal end region of the structural reinforcement member.

A4.4 The airframe of any of paragraphs A4-A4.3, wherein the region of reduced cross-sectional area extends longitudinally beyond the terminal end region of the structural reinforcement member.

A4.5 The airframe of any of paragraphs A4-A4.4, wherein the base flange has a lateral width, and wherein the region of reduced cross-sectional area extends laterally relative to the structural reinforcement member for less than the lateral width, or wherein the region of reduced cross-sectional area does not extend laterally beyond the base flange.

A4.6 The airframe of any of paragraphs A4-A4.5, wherein the region of reduced cross-sectional area defines a void.

A4.6.1 The airframe of paragraph A4.6, wherein the void is an open void (or recess) that faces away from the structural reinforcement member.

A4.6.2 The airframe of paragraph A4.6, wherein the void is an open void (or recess) that faces toward the structural reinforcement member.

A4.6.3 The airframe of paragraph A4.6, wherein the void is a closed void (or pocket) within the skin.

A4.6.4 The airframe of any of paragraphs A4.6-A4.6.3, wherein the void is free of sharp edges (or corners).

A5. The airframe of any of paragraphs A-A4.6.4, wherein the structural reinforcement member is constructed of a carbon fiber reinforced composite material.

A6. The airframe of any of paragraphs A-A5, wherein the skin is constructed of a carbon fiber reinforced composite material.

A6.1 The airframe of paragraph A6 when depending from paragraph A4.6, wherein the carbon fiber reinforced composite material includes a plurality of layers, and wherein the void is at least partially defined by edges of a subset of the plurality of layers.

A7. The airframe of any of paragraphs A-A6.1, wherein the base flange of the structural reinforcement member is adhered to the skin.

A7.1 The airframe of paragraph A7, wherein the base flange of the structural reinforcement member is adhered to the skin within the run-out region.

A7.2 The airframe of any of paragraphs A7-A7.1, wherein the base flange of the structural reinforcement member is adhered to the skin within an entirety of an interface between the base flange and the skin.

A7.3 The airframe of any of paragraphs A7-A7.2, wherein the base flange of the structural reinforcement member is adhered to the skin within an entirety of an interface between the base flange and the skin within the run-out region.

A7.4 The airframe of any of paragraphs A7-A7.1, wherein the base flange of the structural reinforcement member is not adhered to the skin within at least a portion of an interface between the base flange and the skin within the run-out region.

A7.4.1 The airframe of paragraph A7.4, wherein the base flange of the structural reinforcement member is not adhered to the skin within an entirety of the interface between the base flange and the skin within the run-out region.

A7.4.2 The airframe of any of paragraphs A7.4-A7.4.1 when depending from paragraph A4, wherein the portion of the interface between the base flange and the skin within the run-out region is aligned with the region of reduced cross-sectional area.

A8 The airframe of any of paragraphs A-A7.4.2, further comprising:

one or more fasteners extending through and operatively coupling the structural reinforcement member and the skin.

A8.1 The airframe of paragraph A8, wherein the one or more fasteners include at least one fastener that extends within the run-out region.

A8.2 The airframe of any of paragraphs A8-A8.1, wherein the one or more fasteners include at least one fastener that extends outside of and adjacent to the run-out region.

A8.3 The airframe of any of paragraphs A8-A8.2 when depending from paragraph A4, wherein the one or more fasteners include at least one fastener that is positioned laterally adjacent to the region of reduced cross-sectional area within the run-out region.

A8.4 The airframe of any of paragraphs A8-A8.3 when depending from paragraph A4.6, wherein the one or more fasteners include at least one fastener that is positioned laterally adjacent to the void.

A8.5 The airframe of any of paragraphs A8-A8.4 when depending from paragraph A4, wherein the one or more fasteners do not extend through the region of reduced cross-sectional area.

A8.6 The airframe of any of paragraphs A8-A8.5 when depending from paragraph A4.6, wherein the one or more fasteners do not extend through the void.

A8.7. The airframe of paragraph A8, wherein the airframe is free of fasteners that extend through the structural reinforcement member and the skin within the run-out region.

B. An aircraft, comprising the airframe of any of paragraphs A-A8.7.

C. A method of constructing an airframe, the method comprising:

defining a region of increased flexibility of a skin relative to adjacent portions of the skin; and operatively coupling the skin to a structural reinforcement member, wherein the structural reinforcement member has a terminal end region, wherein the operatively coupling defines a run-out region that encompasses the terminal end region and a portion of the skin adjacent to the terminal end region, and wherein the operatively coupling includes positioning the region of increased flexibility within the run-out region.

C1. The method of paragraph C, wherein the defining includes defining a region of reduced cross-sectional area of the skin relative to adjacent portions of the skin.

C1.1 The method of paragraph C1, wherein the defining a region of reduced cross-sectional area of the skin includes layering a plurality of layers of carbon fiber reinforced composite material so that edges of a subset of the plurality of layers at least partially define a void that defines the region of reduced cross-sectional area.

C1.2 The method of any of paragraphs C1-C1.1, wherein the defining a region of reduced cross-sectional area includes molding carbon fiber reinforced composite material to form the skin.

C1.2.1 The method of paragraph C1.2, wherein the molding utilizes a mold that includes a protrusion that defines a void in the skin, wherein the void defines the region of reduced cross-sectional area.

C1.2.2 The method of paragraph C1.2, wherein the molding includes molding carbon fiber reinforced composite material around an insert (and optionally a hollow insert) so that the insert defines a closed void within the skin.

C2. The method of any of paragraphs C-C1.2.2, wherein the operatively coupling includes adhering the skin to the structural reinforcement member.

C2.1 The method of paragraph C2, wherein the adhering includes adhering the skin to the structural reinforcement member within the run-out region.

C2.2 The method of any of paragraphs C2-C2.1, wherein the adhering includes adhering the skin to the structural reinforcement member only within a portion of an interface between the structural reinforcement member and the skin within the run-out region.

C2.3 The method of any of paragraphs C2-C2.1, wherein the adhering includes adhering the skin to the structural reinforcement member within an entirety of an interface between the structural reinforcement member and the skin.

C2.4 The method of paragraph C2, wherein the adhering does not include adhering the skin to the structural reinforcement member within the run-out region.

C3. The method of any of paragraphs C-C2.4, wherein the operatively coupling includes fastening the structural reinforcement member to the skin with one or more fasteners that extend through the structural reinforcement member and the skin outside of and adjacent to the run-out region.

C4. The method of any of paragraphs C-C3, wherein the operatively coupling includes fastening the structural reinforcement member to the skin with one or more fasteners that extend through the structural reinforcement member and the skin within the run-out region.

C4.1 The method of paragraph C4 when depending from paragraph C1, wherein the one or more fasteners that extend through the structural reinforcement member and the skin within the run-out region extend through the structural reinforcement member and the skin laterally adjacent to the region of reduced cross-sectional area.

C5. The method of any of paragraphs C-C4.1, wherein the airframe includes the airframe of any of paragraphs A-A8.7.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. An airframe, comprising:
   a structural reinforcement member including a base flange and a leg extending from the base flange, wherein the structural reinforcement member has a terminal end region that includes a terminal edge of the structural reinforcement member;
   a skin operatively coupled to the base flange opposite the leg and extending longitudinally beyond the terminal end region of the structural reinforcement member, wherein the skin and the structural reinforcement member collectively define a run-out region encompassing the terminal end region of the structural reinforcement member and a portion of the skin adjacent to the terminal end region of the structural reinforcement member, wherein within the run-out region the skin is more flexible than within portions of the skin that are adjacent to the run-out region, wherein within the run-out region a recess extends into the skin on a side of the skin that is opposite the structural reinforcement member, wherein the recess extends into the skin opposite the terminal edge of the structural reinforcement member, and wherein the recess is longitudinally aligned with the leg of the structural reinforcement member;
   a plurality of fasteners extending through and operatively coupling the structural reinforcement member and the skin within the run-out region and laterally adjacent to the recess; and
   a splice plate coupled to the skin opposite the structural reinforcement member within the run-out region, wherein the splice plate extends across the recess.

2. The airframe of claim 1, wherein the base flange has a lateral width, and wherein the run-out region extends longitudinally relative to and extensive with the structural reinforcement member from the terminal edge of the structural reinforcement member for less than five times the lateral width.

3. The airframe of claim 2, wherein the run-out region further extends longitudinally relative to and away from the structural reinforcement member from the terminal edge of the structural reinforcement member for less than five times the lateral width.

4. The airframe of claim 1, wherein the recess extends longitudinally beyond the terminal edge of the structural reinforcement member.

5. The airframe of claim 1, wherein the base flange has a lateral width, and wherein the recess extends laterally relative to the structural reinforcement member for less than the lateral width.

6. The airframe of claim 1, wherein the recess is free of sharp edges and corners.

7. The airframe of claim 1, wherein the skin is constructed of a carbon fiber reinforced composite material, wherein the carbon fiber reinforced composite material includes a plurality of layers, and wherein edges of a subset of the plurality of layers terminate at the recess.

8. The airframe of claim 1, wherein the base flange of the structural reinforcement member is co-bonded with the skin within an entirety of the run-out region.

9. The airframe of claim 1, wherein the base flange of the structural reinforcement member is not adhered to the skin within the run-out region.

10. An aircraft, comprising the airframe of claim 1.

11. A method of constructing the airframe of claim 1, the method comprising:
    defining the recess in the skin; and
    operatively coupling the skin to the structural reinforcement member, wherein the operatively coupling includes positioning the recess within the run-out region.

* * * * *